US007620641B2

(12) United States Patent
Nguyen et al.

(10) Patent No.: US 7,620,641 B2
(45) Date of Patent: Nov. 17, 2009

(54) SYSTEM AND METHOD FOR CONTEXT-SENSITIVE DECOMPOSITION OF XML DOCUMENTS BASED ON SCHEMAS WITH REUSABLE ELEMENT/ATTRIBUTE DECLARATIONS

(75) Inventors: Dung Kim Nguyen, San Jose, CA (US); Mayank Pradhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 11/021,195

(22) Filed: Dec. 22, 2004

(65) Prior Publication Data

US 2006/0136435 A1 Jun. 22, 2006

(51) Int. Cl.
*G06F 17/00* (2006.01)
*G06F 17/30* (2006.01)

(52) U.S. Cl. ............... 707/100; 707/200; 715/234
(58) Field of Classification Search ........... 707/100, 707/200, 101; 715/234, 713
See application file for complete search history.

(56) References Cited

U.S. PATENT DOCUMENTS

| | | | |
|---|---|---|---|
| 5,644,776 A | 7/1997 | DeRose et al. | 395/761 |
| 5,787,449 A | 7/1998 | Vulpe et al. | 707/513 |
| 6,480,865 B1 * | 11/2002 | Lee et al. | 715/234 |
| 6,606,620 B1 | 8/2003 | Sundaresan et al. | 707/3 |
| 6,643,633 B2 | 11/2003 | Chau et al. | 707/1 |
| 6,665,682 B1 * | 12/2003 | DeKimpe et al. | 707/101 |
| 6,687,873 B1 | 2/2004 | Ballantyne et al. | |
| 6,721,727 B2 | 4/2004 | Chau et al. | |
| 6,836,778 B2 * | 12/2004 | Manikutty et al. | 707/102 |
| 7,072,896 B2 * | 7/2006 | Lee et al. | 707/101 |
| 7,096,224 B2 * | 8/2006 | Murthy et al. | 707/100 |
| 7,096,422 B2 * | 8/2006 | Rothschiller et al. | 715/212 |
| 7,168,035 B1 * | 1/2007 | Bell et al. | 715/234 |
| 7,308,455 B2 | 12/2007 | Nguyen et al. | |
| 7,437,374 B2 * | 10/2008 | Chen et al. | 707/101 |
| 2002/0099687 A1 * | 7/2002 | Krishnaprasad et al. | 707/1 |
| 2002/0123993 A1 | 9/2002 | Chau et al. | 707/5 |
| 2002/0133484 A1 | 9/2002 | Chau et al. | |
| 2002/0133497 A1 | 9/2002 | Draper et al. | |
| 2003/0018666 A1 * | 1/2003 | Chen et al. | 707/513 |
| 2003/0126136 A1 * | 7/2003 | Omoigui | 707/10 |
| 2003/0140308 A1 * | 7/2003 | Murthy et al. | 715/500 |
| 2003/0149934 A1 | 8/2003 | Worden | |

(Continued)

OTHER PUBLICATIONS

Amer-Yahia, Sihem, et al., "A Mapping Schema and Interface for XML Stores", WIDM '02, McLean, VA, Nov. 8, 2002, pp. 23-30.*

(Continued)

*Primary Examiner*—Robert Stevens
(74) *Attorney, Agent, or Firm*—Kunzler & McKenzie

(57) ABSTRACT

A system and computer-based method is provided for context-sensitive decomposition of a markup based document into a relational database, based on schemas with reusable item declarations. The user creates a mapping document from a schema of a markup based document with at least one reusable item declaration defining an item being mapped to different tables/columns pairs, depending on the item's ancestry. Mapping document is then annotated with the item ancestry mapping annotation having a location path of the item. Each item is decomposed into a corresponding table column. Preferably, the mapping document is an annotated XML Schema.

15 Claims, 5 Drawing Sheets

U.S. PATENT DOCUMENTS

| | | | |
|---|---|---|---|
| 2003/0163597 A1 | 8/2003 | Hellman et al. | |
| 2003/0182268 A1* | 9/2003 | Lal | 707/3 |
| 2003/0204481 A1 | 10/2003 | Lau | |
| 2003/0236718 A1* | 12/2003 | Yang et al. | 705/28 |
| 2003/0237047 A1 | 12/2003 | Borson | 715/513 |
| 2004/0030701 A1 | 2/2004 | Vandersluis et al. | |
| 2004/0068694 A1* | 4/2004 | Kaler et al. | 715/513 |
| 2004/0143581 A1 | 7/2004 | Bohannon et al. | |
| 2004/0162833 A1* | 8/2004 | Jones et al. | 707/100 |
| 2004/0205082 A1 | 10/2004 | Fontoura et al. | |
| 2005/0027681 A1 | 2/2005 | Bernstein et al. | |
| 2005/0050068 A1* | 3/2005 | Vaschillo et al. | 707/100 |
| 2005/0060332 A1 | 3/2005 | Bernstein et al. | |
| 2005/0091188 A1* | 4/2005 | Pal et al. | 707/1 |
| 2005/0149552 A1* | 7/2005 | Chan et al. | 707/102 |
| 2005/0160110 A1* | 7/2005 | Charlet et al. | 707/102 |
| 2005/0177578 A1* | 8/2005 | Chen et al. | 707/100 |
| 2005/0198013 A1* | 9/2005 | Cunningham et al. | 707/3 |
| 2005/0278358 A1* | 12/2005 | Doughan | 707/100 |
| 2006/0031757 A9* | 2/2006 | Vincent | 715/513 |
| 2006/0101058 A1* | 5/2006 | Chidlovskii | 707/102 |
| 2006/0136435 A1 | 6/2006 | Nguyen et al. | |
| 2006/0136483 A1 | 6/2006 | Nguyen et al. | |
| 2006/0206523 A1 | 9/2006 | Gaurav et al. | |
| 2007/0067343 A1 | 3/2007 | Mihaila et al. | |
| 2007/0198543 A1 | 8/2007 | Nguyen et al. | |

OTHER PUBLICATIONS

Han, Wook-Shin, et al., "An XML Storage System for Object-Oriented/Object-Relational DBMSs", Journal of Object Technology, vol. 2, No. 3, May-Jun. 2003, pp. 113-126.*

Banerjee, Sandeepan, et al., "Oracle8i—The XML Enabled Data Management System", Proc. of the 16th International Conf. on Data Engineering, San Diego, CA, Feb. 29-Mar. 3, 2000, pp. 561-568.*

Tatarinov, Igor, et al., "Storing and Querying Ordered XML Using a Relational Database System", ACM SIGMOD 2002, Madison, WI, Jun. 4-6, 2002, pp. 204-215.*

Amer-Yahia, Sihem, et al., "Logical and Physical Support for Heterogeneous Data", CIKM '02, McLean, VA, Nov. 4-9, 2002, pp. 270-281.*

Varlamis, Iraklis, et al., "Bridging XML-Schema and Relational Databases: A System for Generating and Manipulating Relational Databases Using Valid XML Documents", DocEng '01, Atlanta, GE, Nov. 9-10, 2001, pp. 105-114.*

Harold, Elliotte Rusty, XML Bible, 2nd Edition, Hungry Minds, Inc., New York, NY, © 2001, pp. 3-16, 513, 677-706, 836-841, 848-854 and 871-879.*

Morrison, Michael, et al., XML Unleashed, Sam's Publishing, Dec. 1999, pp. 26-36, 214 and 220-223.*

McKinnon, Linda, et al., XML in 60 Minutes a Day, Wiley Publishing, Inc., Indianapolis, IN © 2003, pp. 164-169 and 300-308.*

Amer-Yahia, Sihem, "Storage Techniques and Mapping Schemas for XML", SIGMOD Record 2003, ACM © 2003, pp. 1-8.*

Amer-Yahia, Sihem, et al., "A Mapping Schema and Interface for XML Stores", WIDM '02, McLean, VA, Nov. 8, 2002, pp. 23-30.*

Du, Fang, et al., "ShreX: Managing XML Documents in Relational Databases", Proc. of the 30th VLDB Conf., Toronto, Canada, Aug. 29-Sep. 3, 2004, pp. 1297-1300.*

Amer-Yahia, Sihem, et al., "A Comprehensive Solution to the XML-to-Relational Mapping Problem", WIDM '04, Washington, DC, Nov. 12-13, 2004, pp. 31-38.*

Pal, Shankar, et al., "Indexing XML Data Stored in a Relational Database", Proc. of the 30th VLDB Conf., Toronto, Canada, Aug. 29-Sep. 3, 2004, pp. 1146-1157.*

Pal, Shankar, et al., "Indexing XML Data Stored in a Relational Database", Proc. of the 30th VLDB Conf., Toronto, Canada, Aug. 31-Sep. 3, 2004, pp. 1146-1157.*

Amer-Yahia, Sihem, et al., "A Mapping Schema and Interface for XML Stores", WIDM '02, McLean, VA, Nov. 8, 2002, pp. 23-30.*

Du, Fang, et al., "ShreX: Managing XML Documents in Relational Databases", Proc. of the 30th VLDB Conf., Toronto, Canada, Aug. 31-Sep. 3, 2004, pp. 1297-1300.*

Zheng, Shihui, et al., "Structural Map: A New Index for Efficient XML Path Expression Processing", WAIM 2002, LNCS 2419, Springer-Verlag Berlin, Germany, © 2002, pp. 25-36.*

Davis, Karen C., et al., "An XML/XPath Query Language and XMark Performance Study", Saint '03, Jan. 27-31, 2003, pp. 422- 427.*

Amer-Yahia, Sihem, et al., "A Comprehensive Solution to the XML-to-Relational Mapping Problem", WIDM '04, Washington, DC, Nov. 12-13, 2004, pp. 31-38.*

Zhang, Hui, et al., "Querying XML Documents by Dynamic Shredding", DocEng '04, Milwaukee, WI, Oct. 28-30, 2004, pp. 21-30.*

Funderburk, John E., et al., "Xtables: Bridging Relational Technology and XML", IBM Systems Journal, vol. 41, No. 4, © 2002, pp. 616-641.*

Li, Yuzhen, et al., "GML Storage: A Spatial Database Approach", ER Workshops 2004, LNCS 3289, Shanghai, China, Nov. 8-12, 2004, pp. 55-66.*

Ramanath, Maya, et al., "Searching for Efficient XML-to-Relational Mappings", XSym 2003, LNCS 2824, Springer-Verlag Berlin, Germany, Sep. 17, 2003, pp. 19-36.*

Krishnamurthy, Rajasekar, et al., "XML-to-SQL Query Translation Literature: The State of the Art and Open Problems", XSym 2003, LNCS 2824, Springer-Verlag Berlin, Germany, Sep. 17, 2003, pp. 1-18.*

Murthy, Ravi, et al., "XML Schemas in Oracle XML DB", Proc. of the 29th VLDB Conf., Berlin, Germany, © 2003, pp. 1009-1018.*

Lo, Ming-Ling, et al., "XAS: A System for Accessing Componentized, Virtual XML Documents", ICSE 2001, May 12-19, 2001, pp. 493-502.*

Gergatsoulis, Manolis, et al., "Representing Changes in XML Documents Using Dimensions", XSym 2003, LNCS 2824, Springer-Verlag, Berlin, Germany, © 2003, pp. 208-222.*

O'Neil, Patrick, et al., "ORDPATHs: Insert-Friendly XML Node Labels", SIGMOD 2004, Paris, France, Jun. 13-18, 2004, pp. 903-908.*

Rahm, Erhard, et al., "A Survey of Approaches to Automatic Schema Matching", The VLDB Journal, vol. 10, Springer-Verlag, Nov. 21, 2001, pp. 334-350.*

Dashofy, "Issues in Generating Data Bindings for an XML Schema-Based Language", Department of Information and Computer Science, University of California-Irvine, 4pgs, http://www.isr.uci.edu/~edashofy/papers/xse2001.pdf, Oct. 7, 2008.

Mani et al., "XML to Relational Conversion Using Theory of Regular Tree Grammars", http://www.springedink.com/app/home/contribution.asp?wasp, 2002, 12 pages.

"Structured Storage of XML Documents", XML Schema and Oracle XML DB, Oracle XML DB Developer's Guide, 3 pgs, Dec. 2003.

"XML-SQL Utility (XSU)", 50 pgs, http://www.oracle.com/technology/tech/xml/xdk/doc/beta/doc/java/xsu/xsu_userguide.html#1015224, © 2000.

"Creating XML Views by Using Annotated XSD Schemas", 2 pgs, http://msdn.microsoft.com/library/default.asp?url=/library/en-us/sglxml3/htm/ssxsdannotations_0ggb.asp, Oct. 7, 2008.

"Modeling XML Schemas as XML Schema Tree (XST)", 6 pages, http://www.irahul.com/xst/xst02/XSTree.pdf, Oct. 7, 2008.

Beyer et al., "DB2 Goes Hybrid; Integrating NAtive XMl and XQuery with Relation Data and SQL", Jan. 17, 2006, IB<System Journal, vol. 45, No. 2: http://www.research.ibm.com/journal/sj/452/beyer.html, pp. 1-31.

XML Schema Part 1: Structures Second Edition, W3C Recommendation, Oct. 28, 2004, http://www.w3.org/TR/xmlschema-1/, 98 pages.

XML Schema Part 2: Datatypes Second Edition, W3C Recommendation Oct. 28, 2004, http://w3.org/TR/xmlschema-2/, 100 pages.

XML Schema Part 1: Structures Second Edition, W3C Recommendation, Oct. 28, 2004, http://www.w3.org/TR/2004/REC-xmlschema-1-20041028/structures.html, 98 pages.

* cited by examiner

```xml
<xsd:element name="address">
 <xsd:complexType>
  <xsd:sequence>
   <xsd:element name="street" type="xsd:string" >
    <xsd:annotation>        <xsd:appinfo>
     <db2-xdb:tableMapping>
      <db2-xdb:rowSet>tabA</db2-xdb:rowSet>
      <db2-xdb:column>street</db2-xdb:column>
     </db2-xdb:tableMapping>
    </xsd:appinfo>   </xsd:annotation>
   </xsd:element>
   <xsd:element name="city" type="xsd:string">
    <xsd:annotation>        <xsd:appinfo>
     <db2-xdb:tableMapping>
      <db2-xdb:rowSet>tabA</db2-xdb:rowSet>
      <db2-xdb:column>city</db2-xdb:column>
     </db2-xdb:tableMapping>
    </xsd:appinfo>   </xsd:annotation>
   </xsd:element>
   <xsd:element name="zip" type="xsd:string" >
    <xsd:annotation>        <xsd:appinfo>
     <db2-xdb:tableMapping>
      <db2-xdb:rowSet>tabA</db2-xdb:rowSet>
      <db2-xdb:column>zipcode</db2-xdb:column>
     </db2-xdb:tableMapping>
    </xsd:appinfo>   </xsd:annotation>
   </xsd:element>
  </xsd:sequence>
 </xsd:complexType>
</xsd:element>
```

FIG. 1 (Prior Art)

```
<xsd:element name="address">
<xsd:complexType>
<xsd:sequence>
<xsd:element name="street" type="xsd:string" >
  <xsd:annotation>      <xsd:appinfo>
    <db2-xdb:tableMapping>
      <db2-xdb:rowSet>tabA</db2-xdb:rowSet>
      <db2-xdb:column>street</db2-xdb:column>
      <db2-xdb:locationPath>/hospital/address/street</db2-xdb:locationPath>
    </db2-xdb:tableMapping>
    <db2-xdb:tableMapping>
      <db2-xdb:rowSet>tabCustInfo</db2-xdb:rowSet>
      <db2-xdb:column>street</db2-xdb:column>
      <db2-xdb:locationPath>/customer/address/street</db2-xdb:locationPath>
    </db2-xdb:tableMapping>
  </xsd:appinfo>  </xsd:annotation>
</xsd:element>
<xsd:element name="city" type="xsd:string"/>
  <xsd:annotation>      <xsd:appinfo>
    <db2-xdb:tableMapping>
      <db2-xdb:rowSet>tabA</db2-xdb:rowSet>
      <db2-xdb:column>city</db2-xdb:column>
      <db2-xdb:locationPath>/hospital/address/city</db2-xdb:locationPath>
    </db2-xdb:tableMapping>
    <db2-xdb:tableMapping>
      <db2-xdb:rowSet>tabCustInfo</db2-xdb:rowSet>
      <db2-xdb:column>city</db2-xdb:column>
      <db2-xdb:locationPath>/customer/address/city</db2-xdb:locationPath>
```

FIG. 2A

```
      </db2-xdb:tableMapping>
    </xsd:appinfo>  </xsd:annotation>
   </xsd:element>
   <xsd:element name="zip" type="xsd:string" />
    <xsd:annotation>        <xsd:appinfo>
      <db2-xdb:tableMapping>
        <db2-xdb:rowSet>tabA</db2-xdb:rowSet>
        <db2-xdb:column>zipcode</db2-xdb:column>
        <db2-xdb:locationPath>/hospital/address/zip</db2-xdb:locationPath>
      </db2-xdb:tableMapping>
      <db2-xdb:tableMapping>
        <db2-xdb:rowSet>tabCustInfo</db2-xdb:rowSet>
        <db2-xdb:column>zip</db2-xdb:column>
        <db2-xdb:locationPath>/customer/address/zip</db2-xdb:locationPath>
      </db2-xdb:tableMapping>
     </xsd:appinfo>  </xsd:annotation>
   </xsd:element>
  </xsd:sequence>
 </xsd:complexType>
</xsd:element>
```

FIG. 2B

SYSTEM AND METHOD FOR CONTEXT-SENSITIVE DECOMPOSITION OF XML DOCUMENTS BASED ON SCHEMAS WITH REUSABLE ELEMENT/ATTRIBUTE DECLARATIONS

BACKGROUND OF THE INVENTION

1. Field of the Invention

This invention relates in general to database management systems performed by computers, and in particular to an optimized method and system for context-sensitive decomposition of markup based documents, such as XML documents, into a relational database, based on schemas with reusable element/attribute declarations.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

Extensible Markup language (XML) is a standard data-formatting mechanism used for representing data on the Internet in a hierarchical data format and for information exchange. An XML document consists of nested element structures, starting with a root element. There are numerous conventional software products used for decomposing and transferring data contained in an XML document and storing it in a database.

Decomposition of an XML document is the process of breaking the document into component pieces and storing those pieces in a database. The specification of the pieces and where they are to be stored is accomplished by means of a mapping document. Mapping document may be in the form of a set of XML schema documents that describe the structure and data types used in conforming XML instance documents. XML schema documents are augmented with annotations that describe the mapping of XML components to tables/columns in a relational database. Annotations are a feature of XML schema that provide for application-specific information to be supplied to programs processing the schema.

In the context of decomposition, the key pieces of an XML document are elements and attributes. The corresponding XML schema describes the structure of the elements and attributes in the form of an element/attribute declaration. Annotations may be added to these declarations to specify the target table-column in which the content of an element/attribute, from an XML instance document, is to be stored. Presently known decomposition methods that utilize XML schemas are limited because, when provided with the same declaration for several items, used in multiple places in an XML schema, they have to map all the items into the same table-column pair and cannot store them in different destinations. The problem is best described by FIG. 1.

An exemplary user-defined XML schema having element declaration annotations mapping it to a relational database is shown in FIG. 1. Mapping annotations are indicated by the prefix "db2-xdb", which is associated with the namespace for DB2's decomposition feature: http://www.ibm.com/xmlns/product/db2/xdb1. The element declaration of FIG. 1 shows that the components of <address> are mapped to columns "street", "city", "zipcode" of table "tabA."

This example illustrates a limitation with this approach to mapping where the element <address> may be used in many contexts in an XML schema because its declaration in an XML schema is a global one, and other elements can contain <address> as a child element by referring to

---

```
<address> in their declarations:
    <xsd:element name="hospital">
        <xsd:complexType>
            <xsd:sequence>
                <xsd:element ref="address"/>
                ...
        </xsd:element>
        <xsd:element name="customer">
            <xsd:complexType>
                <xsd:sequence>
                    <xsd:element ref="address"/>
                    ...
        </xsd:element>
```

---

In this example both hospital and customer have <address> in their declarations, and decomposition is performed regardless of the context. It is unlikely that an application would want hospital addresses to be decomposed into the same table as customer addresses. For the exemplary mapping of FIG. 1, context-sensitive decomposition is not possible for global element/attribute declarations that are used in multiple places in an XML schema.

Example of FIG. 1 illustrates one problem in decomposition, occurring for global element and attribute declarations. However, the problem also exists for element/attribute declarations that are part of named model groups, part of named attribute groups, or named complex types. Part of the problem lies in the W3 XML Schema recommendation's incomplete specification of the requirements, that a conformant schema processor must meet with respect to providing application access to annotations attached to element/attribute references. However, even if the recommendation were to be updated to address the accessibility of annotations on element/attribute references, the problem of providing context-sensitive decomposition for element/attribute declarations that are part of named model groups, part of named attribute groups or named complex types would still remain.

Global element and attribute declarations, named model groups, named attribute groups and named complex types are all reusable declarations. Presently, there are no solutions to the mentioned problems in context-sensitive decomposition of global element and attribute declarations, parts of named model groups, parts of named attribute groups or parts of named complex types.

While there have been various, including application-specific, techniques developed for decomposing and storing of markup based documents, such as XML documents, in a database, there is a need for a general method which will allow context-sensitive decomposition to a relational database, based on XML schemas with reusable element/attribute declarations, where the mapping document can be any user-defined XML schema and the mapping is user-controlled.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for context-sensitive decomposition of a markup based document into a relational database, based on their schemas with reusable item declarations. User creates a mapping document from a schema of a markup based document with at least one reusable item declaration defining an item being mapped to different tables/columns pairs, depending on the item's ancestry. Mapping document is then annotated with the item ancestry mapping annotation having a location path of the item. Each item is decomposed into a corresponding table column. Preferably, the mapping document is an annotated XML Schema.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout:

FIG. 1 illustrates an exemplary user-defined XML schema having element declaration annotations mapping it to a relational database;

FIGS. 2A-2B illustrate an extended annotated XML schema with location path annotations, according to the preferred embodiments of the present invention;

DETAILED DESCRIPTION OF THE PREFERRED EMBODIMENTS

Figure 3:
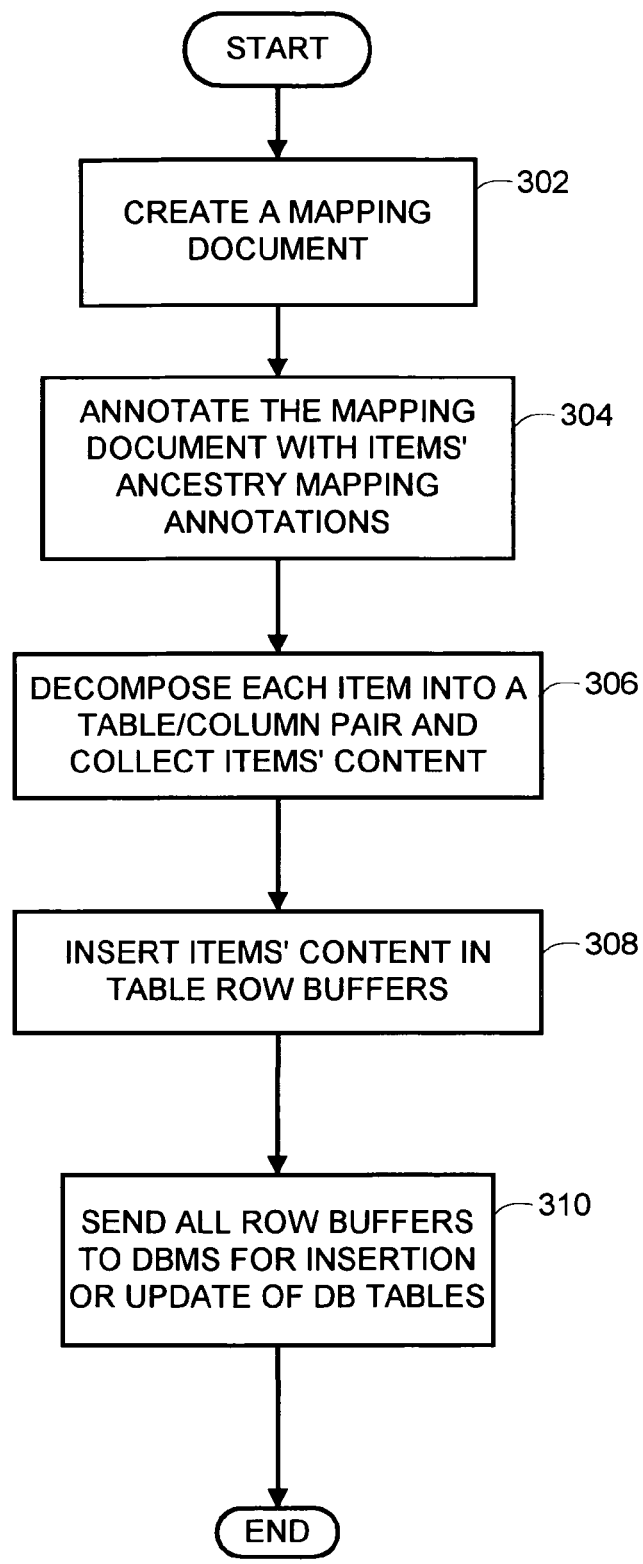
FIG. 3 illustrates a flowchart of the module used for the markup based document decomposition, according to the preferred embodiments of the present invention.

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, method and computer usable medium, tangibly embodying a program of instructions executable by the computer to perform method steps of the present invention, for decomposing and storing of markup based documents, such as Extensible Markup Language (XML) documents to a relational database, using a context-sensitive decomposition, based on schemas with reusable element/attribute declarations, where the mapping document can be any user-defined annotated XML schema of the mapping document and the mapping is user-controlled. Reusable declarations may be global element and attribute declarations, named model groups, named attribute groups and named complex types.

The method and system of the present invention may be used in a distributed computing environment in which two or more computer systems are connected by a network, such as World Wide Web, including environments in which the networked computers are of different type. The preferred method embodiment of the present invention decomposes the XML documents into database data. The aspects of the present invention utilize functions of the relational database and RDBMS engine.

Decomposition of an XML document is the process of breaking the document into component pieces and storing those pieces in a database. The specification of the pieces and where they are to be stored is accomplished by means of a mapping document. Mapping documents can have various formats. One format of mapping documents is a set of XML schema documents that describe the structure of conforming XML instance documents. The XML schemas are augmented with annotations that describe the mapping of XML components to tables/columns of a relational database. Annotations provide application-specific information to programs processing the schema or instance documents.

To enable decomposition, the preferred aspects of the present invention supply context information to the mapping information associated with reusable element/attribute declarations of an annotated XML schema document. This is achieved with the introduction of an additional, location annotation, named locationPath, which adds the ancestry path context of an element/attribute item as part of information about its mapping to a table-column pair.

LocationPath syntax is defined as:

```
location path := '/' (locationstep '/' )* lastlocationstep
locationstep := (prefix ':' )? name
lastlocationstep := locationstep | '@' name
``` where name is an element or attribute name, prefix is a namespace prefix, and location path is defined as a series of steps which start with the root and are separated by a '/' symbol. All namespace prefixes, used in the location path, must have been associated with a namespace in the XML schema document containing the annotation specifying this location path. If a name in a locationstep is unprefixed, the namespace for the schema document, in which the annotation appears, is assumed as the default.

The locationPath annotation is optional for element/attribute declarations that cannot be reused, such as for local declarations that are not part of a named complex type definition, named model group or named attribute group. However, when the element/attribute declaration is global, part of a named model group, part of a named attribute group or part of a named complex type, its appearance in an instance XML document can be in multiple ancestry lines. Therefore, when such an element or attribute is to be mapped to different tables/columns, depending on its ancestry, the locationPath annotation of the present invention specifies the absolute ancestry path, from root to the element/attribute being mapped, for which the table-column mapping applies.

FIGS. 2A-2B illustrate an XML schema which extends the exemplary schema of FIG. 1 with the locationPath annotation showing element/attribute ancestry, according to the preferred aspects of the present invention. The example of FIGS. 2A-2B specifies that <address> elements that appear as children of <customer> elements are decomposed into different target tables/columns from <address> elements that appear as children of <hospital> elements, thus satisfying the context-sensitive decomposition needs and solving the problem of the presently known systems.

According to an aspect of the present invention, when the locationPath annotation is absent in a mapping of a reusable element, the element/attribute is always mapped to the same table-column pair, regardless of the ancestry of the element/attribute. This aspect provides the flexibility for users to perform both context-sensitive and across-the-board mappings, as appropriate to their applications. Moreover, not all context-insensitive mappings are allowed and if an element/attribute, whose mapping omits locationPath, can be reached via two different paths from the same root element, an error may be declared.

In some aspects of the present invention, an XML schema is represented as a set of directed graphs which describe the structure of any conforming XML document. Each instance XML document has its own directed graph, determined by the root element of the XML instance document. In the graph, each element/attribute declaration or reference is represented by a graph node. There is a directed edge from node A to node B iff the element declaration of <A> specifies that an element <B> can appear as a subelement of <A>, or B is an attribute of <A> in a conforming instance XML document. A graph node contains mapping information if one of the following conditions is true: node ancestry path matches the locationPath specification of an annotation in the corresponding element/attribute declaration of the XML schema, or the node corresponds to an element/attribute declaration with an annotation that does not include a locationPath specification. An ancestry path is the location path from the root of a directed graph to the node itself. Term "corresponding element/attribute declaration" means that all references to named model groups, named complex types, elements and attributes have already been resolved.

At the beginning of the process of decomposing an instance XML document, the appropriate directed graph, determined by the root element of the instance document, is materialized from the XML schema. The instance document is then parsed, and as each element/attribute is encountered from the parsing, the directed graph is traversed accordingly. During traversal, on reaching any node containing mapping information, the content of the currently parsed element/attribute is saved in a buffer for insertion or update of the table-column pair specified in the mapping information.

Flowchart of a computer-based method for decomposing and storing of a markup based document into a relational database, performed according to the preferred embodiments of the present invention, is illustrated in FIG. 3. In step 302 of FIG. 3, a user creates a mapping document, corresponding to a schema of the markup based document, which defines the structure of the conforming markup based document and states which table and column will hold the content of a markup based document item. In the present invention, the mapping document has at least one reusable item declaration which defines an item being mapped to different table-column pairs, depending on the item's ancestry. In step 304, the user annotates the mapping document with the items' ancestry mapping annotations, where each annotation for mapping element/attribute into a target table-column pair has a location path of the item, for context-sensitive decomposition of reusable declarations.

Step 306 is used to decompose each item into a corresponding table/column pair. Thus, for each database table a set of row buffers is assigned so that each row buffer can hold content for all item columns belonging to a table row. Decomposition function of step 306 performs decomposition of each markup based document item into a corresponding row buffer column, when invoked with the inputted annotated mapping document and instance markup based document. Decomposition utility parses the markup based document and collects each item's content. It finds the item mapping information in the element/attribute declaration in the mapping document, which includes a table and column names. Item content is inserted into the table row buffer's column, for later storage in the corresponding database table row. Parsing of the markup based document continues until all items that have mappings are found and their content is placed in corresponding table's row buffers' columns, in step 308. At the end of decomposition, in step 310, all row buffers are sent to the DBMS for insertion into or update of the corresponding database tables.

When the aspects of the present invention use directed graphs, at the beginning of the decomposition process the appropriate set of directed graphs with mapping information is created to represent the XML schema. The instance document is then parsed, and as each element/attribute is encountered from the parsing, the directed graph is traversed accordingly. During traversal, on reaching any node containing mapping information, the content of the currently parsed element/attribute is saved in a table row buffer for insertion or update of the table-column pair specified in the item node mapping information.

Figure 4:
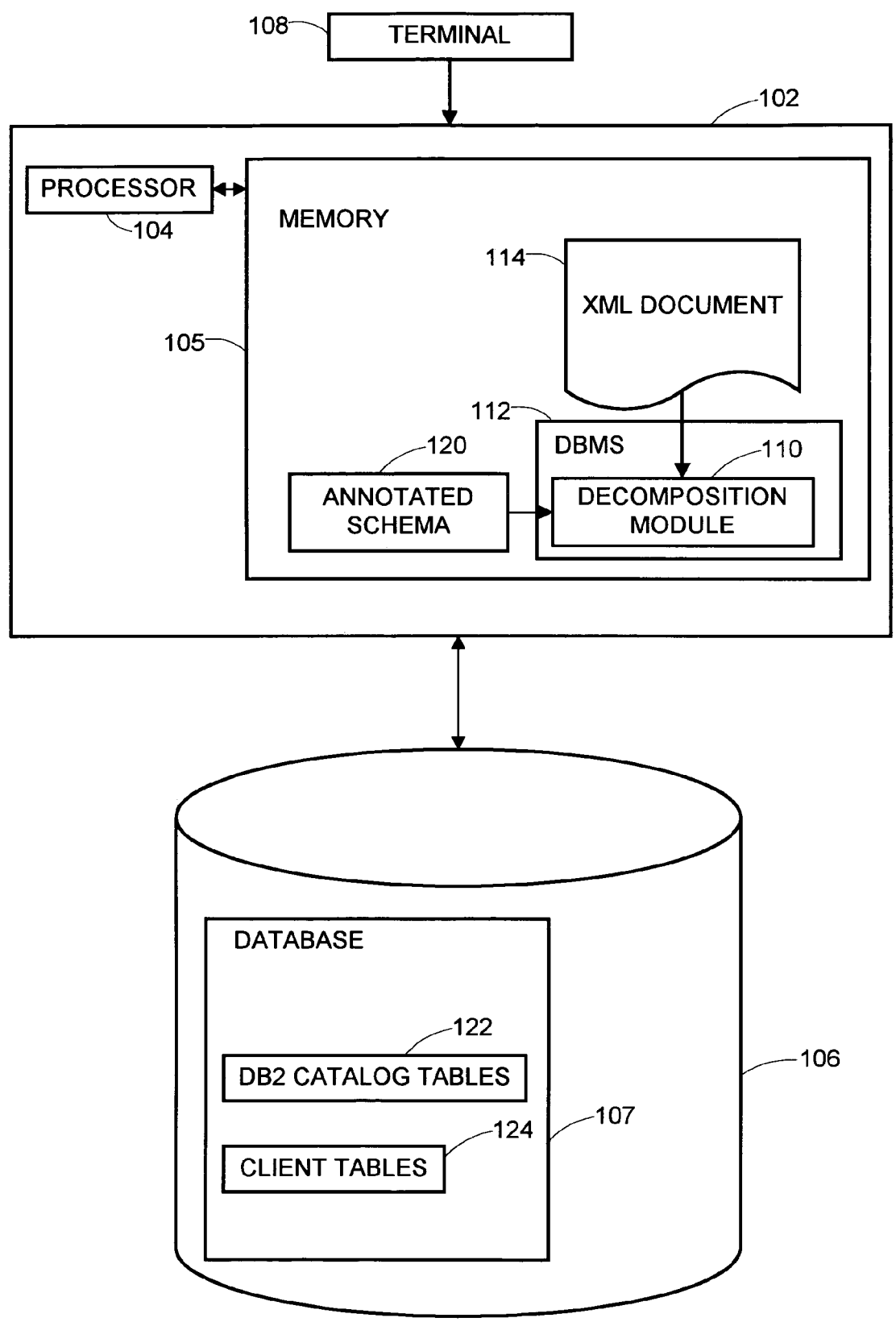
FIG. 4 illustrates a computer hardware and software environment enabling markup decomposition, according to the preferred embodiments of the present invention.

FIG. 4 illustrates an exemplary computer hardware and software environment usable by the preferred embodiments of the present invention for enabling decomposition. It includes a console 102 having one or more conventional processors 104 executing instructions stored in an associated computer memory 105, and having a console terminal 108. The memory 105 can be loaded with instructions received through an optional storage drive or through an interface with a computer network.

The processor 104 is connected to one or more electronic storage devices 106, such as disk drives, that store one or more relational databases 107. They may comprise, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiment of the present invention. Alternatively, the program steps can be received into the operating memory from a computer over the network.

Operators of the console terminal 108 use a standard operator terminal interface (not shown) to transmit electrical signals to and from the console 102, that represent commands for performing various tasks, such as search and retrieval functions, termed queries, against the databases 107 stored on the electronic storage device 106. In the present invention, these queries conform to the Structured Query Language (SQL) standard, and invoke functions performed by a DataBase Management System (DBMS) 112, such as a Relational DataBase Management System (RDBMS) software. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries.

FIG. 4 further illustrates a software environment enabling preferred embodiments of the present invention. In the system shown in FIG. 4 the console 102 further includes a decomposition software module 110 of the present invention. The computer-based decomposition software module 110 incorporates a method for transferring data contained in a markup based document, such as an XML document 114, into a relational database 107, stored in the electronic storage device 106. When the DBMS is DB2, relational database 107 has DB2 catalog tables 122 and client tables 124. Decomposition software module 110 is used for decomposing markup based documents, such as XML documents 114, into a relational database client tables 124, wherein multiple items are decomposed into different table-column pairs. For that purpose, decomposition software module 110 uses an annotated XML schema 120, created according to the preferred aspects of the present invention.

Although the description of the preferred embodiments of the present invention was based on XML documents, the present invention is applicable to other types of markup based documents. The present invention is being implemented in a DB2 product. However, it is useable by end users of any DBMS products providing XML support, for processing and decomposition of XML documents. It will preferably be used for developing applications for DB2 machines. The present invention works with DB2 Universal Database, on UNIX and Windows. However, the technology may be applied to any other database manager products that decompose using XML-based schema mapping documents, such as Oracle, Informix, Sybase, SQL Anywhere, and Microsoft SQL Server, and other relational products.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for context-sensitive decomposition of a markup based document into a relational database executing on a processor and memory, based on schemas with reusable item declarations, comprising:

creating a mapping document from an annotated Extensible Markup Language (XML) schema that describes a plurality of XML documents, the annotated XML schema comprising:

at least one reusable item declaration, wherein a reusable item declaration is an XML schema item that can be used at two or more unique locations in the XML schema;

at least one of the reusable item declarations, having at least one mapping annotation, each mapping annotation comprising:

a table/column pair specifying a table/column in the relational database where an item associated with the reusable item declaration is stored during decomposition; and a location path specifying the ancestry of the reusable item declaration and uniquely identifying the reusable item declaration;

for each reusable item declaration:

determining the ancestry of the reusable item declaration; and annotating the mapping document with the table/column pair that corresponds to the location path in the mapping annotation in response to the location path matching the ancestry of the reusable item declaration being mapped; and decomposing each said reusable item declaration into a corresponding database table column specified by the mapping annotation in the mapping document.

2. The method according to claim 1, wherein the reusable item declarations are chosen from the group comprising global item declarations, named model group declarations, named attribute group declarations and named complex type declarations.

3. The method according to claim 1, wherein the mapping document is an annotated XML Schema represented by a directed graph, wherein each said item ancestry mapping annotation is represented by a graph node having the item ancestry path mapping data and an ancestry path is a location path from a root of the directed graph to the node itself.

4. The method according to claim 3, wherein the location path specifies an absolute path, from a root of the directed graph to the item, being specified as:

location path :='/' (locationstep '/')* lastlocationstep; locationstep := (namespace prefix ':')? item name; lastlocationstep := locationstep | '@' item name, and wherein the namespace prefixes, used in the location path, have been associated with a namespace in the mapping document.

5. The method according to claim 1, wherein the method being incorporated in a DB2 product.

6. A computer-based system for context-sensitive decomposition of a markup based document into a relational database executing on a processor and memory, based on schemas with reusable item declarations, comprising:

a relational database executing on a computer having a processor and memory;

a decomposition module executing on a processor and memory for receiving one or more Extensible Markup Language (XML) documents and decomposing the one or more XML documents into the relational database, the decomposition module:

creating a mapping document from an annotated Extensible Markup Language (XML) schema that describes a plurality of XML documents, the annotated XML schema comprising:

at least one reusable item declaration, wherein a reusable item declaration is an XML schema item that can be used at two or more unique locations in the XML schema;

for at least one of the reusable item declarations, a plurality of mapping annotations comprising a table/column pair and a location path, wherein each of the plurality of mapping annotations specifies an item being mapped to the table/column pair that is associated with the location path, wherein the location path specifies the reusable item declaration's ancestry;

for each reusable item declaration having a plurality of mapping annotations, annotating the mapping document with the mapping annotation corresponding to the location path that specifies the ancestry of the reusable item declaration being mapped; and decomposing each said reusable item declaration into a corresponding database table column specified by the mapping annotation in the mapping document.

7. The system of claim 6, wherein the reusable item declarations are chosen from the group comprising global item declarations, named model group declarations, named attribute group declarations and named complex type declarations.

8. The system of claim 6, wherein the mapping document is an annotated XML Schema represented by a directed graph, wherein each said item ancestry mapping annotation is represented by a graph node having the item ancestry path mapping data and an ancestry path is a location path from a root of the directed graph to the node itself.

9. The system of claim 8, wherein the location path specifies an absolute path, from a root of the directed graph to the item, being specified as:

location path :='/' (locationstep '/')* lastlocationstep; locationstep := (namespace prefix ':')? item name; lastlocationstep := locationstep | '@' item name, and wherein the namespace prefixes, used in the location path, have been associated with a namespace in the mapping document.

10. The system of claim 6, wherein the relational database is a DB2 database.

11. A computer usable storage medium embodying a program of instructions executable by the computer for context-sensitive decomposition of a markup based document into a relational database, based on schemas with reusable item declarations, the instructions comprising:

creating a mapping document from an annotated Extensible Markup Language (XML) schema that describes a plurality of XML documents, the annotated XML schema comprising:

at least one reusable item declaration, wherein a reusable item declaration is an XML schema item that can be used at two or more unique locations in the XML schema;

for at least one of the reusable item declarations, a plurality of mapping annotations comprising a table/column pair and a location path, wherein each of the plurality of mapping annotations specifies an item being mapped to the table/column pair that is associated with the location path, wherein the location path specifies the reusable item declaration's ancestry;

for each reusable item declaration having a plurality of mapping annotations, annotating the mapping document with the mapping annotation corresponding to the location path that specifies the ancestry of the reusable item declaration being mapped; and decomposing each said reusable item declaration into a corresponding database table column specified by the mapping annotation in the mapping document.

12. The computer usable storage medium of claim 11, wherein the reusable item declarations are chosen from the group comprising global item declarations, named model group declarations, named attribute group declarations and named complex type declarations.

13. The computer usable storage medium of claim 11, wherein the mapping document is an annotated XML Schema represented by a directed graph, wherein each said item ancestry mapping annotation is represented by a graph node having the item ancestry path mapping data and an ancestry path is a location path from a root of the directed graph to the node itself.

14. The computer usable storage medium of claim 11, wherein the location path specifies an absolute path, from a root of the directed graph to the item, being specified as:

location path :='/' (locationstep '/')* lastlocationstep; locationstep := (namespace prefix ':')? item name; lastlocationstep := locationstep | '@' item name, and wherein the namespace prefixes, used in the location path, have been associated with a namespace in the mapping document.

15. The computer usable storage medium of claim 11, the program of instructions being incorporated in a DB2 product.

* * * * *

UNITED STATES PATENT AND TRADEMARK OFFICE
CERTIFICATE OF CORRECTION

PATENT NO. : 7,620,641 B2
APPLICATION NO. : 11/021195
DATED : November 17, 2009
INVENTOR(S) : Nguyen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this

Twenty-sixth Day of October, 2010

David J. Kappos
*Director of the United States Patent and Trademark Office*